(12) United States Patent
Gunji

(10) Patent No.: US 12,011,952 B2
(45) Date of Patent: Jun. 18, 2024

(54) PNEUMATIC TIRE

(71) Applicant: The Yokohama Rubber Co., LTD., Tokyo (JP)

(72) Inventor: Ryota Gunji, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 635 days.

(21) Appl. No.: 17/267,785

(22) PCT Filed: Aug. 9, 2019

(86) PCT No.: PCT/JP2019/031772
§ 371 (c)(1),
(2) Date: Feb. 10, 2021

(87) PCT Pub. No.: WO2020/032278
PCT Pub. Date: Feb. 13, 2020

(65) Prior Publication Data
US 2021/0162815 A1    Jun. 3, 2021

(30) Foreign Application Priority Data

Aug. 10, 2018 (JP) ................................ 2018-151719

(51) Int. Cl.
*B60C 11/03* (2006.01)
*B60C 11/12* (2006.01)

(52) U.S. Cl.
CPC ...... *B60C 11/0309* (2013.01); *B60C 11/1204* (2013.01); *B60C 11/1236* (2013.01);
(Continued)

(58) Field of Classification Search
CPC ............. B60C 11/0309; B60C 11/0306; B60C 11/1204; B60C 11/1236; B60C 11/1281;
(Continued)

(56) References Cited

U.S. PATENT DOCUMENTS

2006/0130950 A1*  6/2006  Murata ............... B60C 11/1323
                                               152/209.24
2011/0308679 A1   12/2011  Hirose et al.
(Continued)

FOREIGN PATENT DOCUMENTS

JP    H07-040712     2/1995
JP    2006-151029    6/2006
(Continued)

OTHER PUBLICATIONS

International Search Report for International Application No. PCT/JP2019/031772 dated Nov. 12, 2019, 4 pages, Japan.

*Primary Examiner* — Justin R Fischer
*Assistant Examiner* — Philip N Schwartz
(74) *Attorney, Agent, or Firm* — Thorpe North & Western

(57) ABSTRACT

The pneumatic tire includes a shoulder main groove and a center main groove disposed in one region demarcated by a tire equatorial plane and a shoulder land portion and a middle land portion defined by the shoulder main groove. The shoulder land portion is a rib that is continuous in a tire circumferential direction, and the middle land portion includes a plurality of middle lug grooves and a plurality of middle blocks defined by the plurality of middle lug grooves. When defining a section in the tire circumferential direction along an edge portion of one middle block close to the shoulder main groove, a groove width of the shoulder main groove continuously increases or decreases in the section.

14 Claims, 11 Drawing Sheets

(52) U.S. Cl.
 CPC ... *B60C 11/1281* (2013.01); *B60C 2011/0346* (2013.01); *B60C 2011/0353* (2013.01); *B60C 2011/036* (2013.01); *B60C 2011/039* (2013.01)

(58) Field of Classification Search
 CPC ................. B60C 11/1384; B60C 11/11; B60C 2011/0346; B60C 2011/0353; B60C 2011/036; B60C 2011/039
 See application file for complete search history.

(56) References Cited

U.S. PATENT DOCUMENTS

| | | |
|---|---|---|
| 2013/0098520 A1 | 4/2013 | Kato |
| 2018/0015790 A1 | 1/2018 | Oji |
| 2021/0260929 A1* | 8/2021 | Tokunaga ........... B60C 11/1281 |

FOREIGN PATENT DOCUMENTS

| | | |
|---|---|---|
| JP | 2010-247626 | 11/2010 |
| JP | 2011-235701 | 11/2011 |
| JP | 2012-001155 | 1/2012 |
| JP | 2016-074243 | 5/2016 |
| JP | 2018-008586 | 1/2018 |
| WO | WO 2011/138939 | 11/2011 |

* cited by examiner

| | Conventional example | Example 1 | Example 2 | Example 3 | Example 4 | Example 5 | Example 6 | Example 7 |
|---|---|---|---|---|---|---|---|---|
| Continuous increase or decrease in groove width | Yes Center main groove | Yes | Yes | Yes | Yes | Yes | Yes | Yes |
| Ld_min/P2 | 0.19 | 0.19 | 0.20 | 0.20 | 0.20 | 0.20 | 0.20 | 0.25 |
| Number of extreme points | 4 | 4 | 3 | 3 | 3 | 3 | 3 | 3 |
| W1a/W1b | 1.30 | 1.60 | 1.50 | 1.50 | 1.40 | 1.40 | 1.30 | 1.30 |
| Dt/W1 | 0.78 | 0.78 | 0.78 | 0.70 | 0.70 | 0.70 | 0.70 | 0.70 |
| Dp/P1 | 0.35 | 0.35 | 0.50 | 0.50 | 0.40 | 0.40 | 0.40 | 0.30 |
| La1/P1 | 1.00 | 1.00 | 1.00 | 1.00 | 1.00 | 0.90 | 0.90 | 0.90 |
| La2/Le2 | 0.86 | 0.86 | 0.95 | 0.95 | 0.95 | 0.95 | 0.95 | 0.95 |
| Noise performance | 100 | 102 | 104 | 105 | 106 | 107 | 110 | 115 |
| Wet performance | 100 | 104 | 103 | 104 | 103 | 105 | 106 | 110 |
| Uneven wear resistance performance | 100 | 98 | 98 | 98 | 98 | 100 | 102 | 102 |

FIG. 10A

| | Example 8 | Example 9 | Example 10 | Example 11 | Example 12 | Example 13 | Example 14 | Example 15 | Example 16 |
|---|---|---|---|---|---|---|---|---|---|
| Continuous increase or decrease in groove width | Yes | Yes | Yes | Yes | Yes | Yes | Yes | Yes | Yes |
| Ld_min/P2 | 0.25 | 0.25 | 0.25 | 0.25 | 0.25 | 0.25 | 0.25 | 0.25 | 0.30 |
| Number of extreme points | 3 | 3 | 3 | 3 | 3 | 3 | 3 | 3 | 3 |
| W1a/W1b | 1.20 | 1.20 | 1.20 | 1.10 | 1.10 | 1.10 | 1.10 | 1.10 | 1.00 |
| Dt/W1 | 0.70 | 0.70 | 0.70 | 0.70 | 0.60 | 0.60 | 0.60 | 0.60 | 0.60 |
| Dp/P1 | 0.30 | 0.20 | 0.20 | 0.20 | 0.20 | 0.15 | 0.15 | 0.15 | 0.15 |
| La1/P1 | 0.90 | 0.90 | 0.80 | 0.80 | 0.80 | 0.80 | 0.80 | 0.80 | 0.80 |
| La2/Le2 | 0.95 | 1.00 | 1.00 | 1.00 | 1.00 | 1.00 | 1.00 | 1.05 | 1.05 |
| Noise performance | 114 | 114 | 112 | 108 | 106 | 103 | 103 | 100 | 95 |
| Wet performance | 108 | 104 | 103 | 102 | 101 | 100 | 100 | 100 | 100 |
| Uneven wear resistance performance | 101 | 100 | 100 | 100 | 100 | 100 | 109 | 107 | 107 |

PNEUMATIC TIRE

TECHNICAL FIELD

The technology relates to a pneumatic tire and particularly relates to a pneumatic tire with improved noise performance of the tire.

BACKGROUND ART

In order to improve the wet traction characteristics of a tire, a pneumatic tire for pickup trucks includes a row of blocks defined by through lug grooves in a tread portion center region. However, such a tread pattern has a problem that pass-by noise performance of the tire degrades. The technology described in Japan Unexamined Patent Publication No. H07-40712A is known as a conventional pneumatic tire which aims to improve pass-by noise performance of the tire.

SUMMARY

The technology provides a pneumatic tire with improved noise performance of the tire.

A pneumatic tire according to an embodiment of the technology is a pneumatic tire including: a shoulder main groove and a center main groove disposed in one region demarcated by a tire equatorial plane; and a shoulder land portion and a middle land portion defined by the shoulder main groove, the shoulder land portion being a rib that is continuous in a tire circumferential direction, the middle land portion comprising a plurality of middle lug grooves and a plurality of middle blocks defined by the plurality of middle lug grooves, a section A in the tire circumferential direction being defined along an edge portion, close to the shoulder main groove, of one of the plurality of middle blocks, and a groove width of the shoulder main groove continuously increasing or decreasing in the section A.

The pneumatic tire according to an embodiment of the technology provides an advantage that since the groove width of the shoulder main groove increases or decreases continuously, air column resonance generated in the shoulder main groove is reduced, and the pass-by noise performance of the tire is improved.

BRIEF DESCRIPTION OF DRAWINGS

FIGS. 10A and 10B include a table showing the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency of the technology, and obviously substitutable elements. Furthermore, the plurality of deformed examples described in the embodiments can be combined as desired within the scope apparent to one skilled in the art.

Pneumatic Tire

Figure 1:
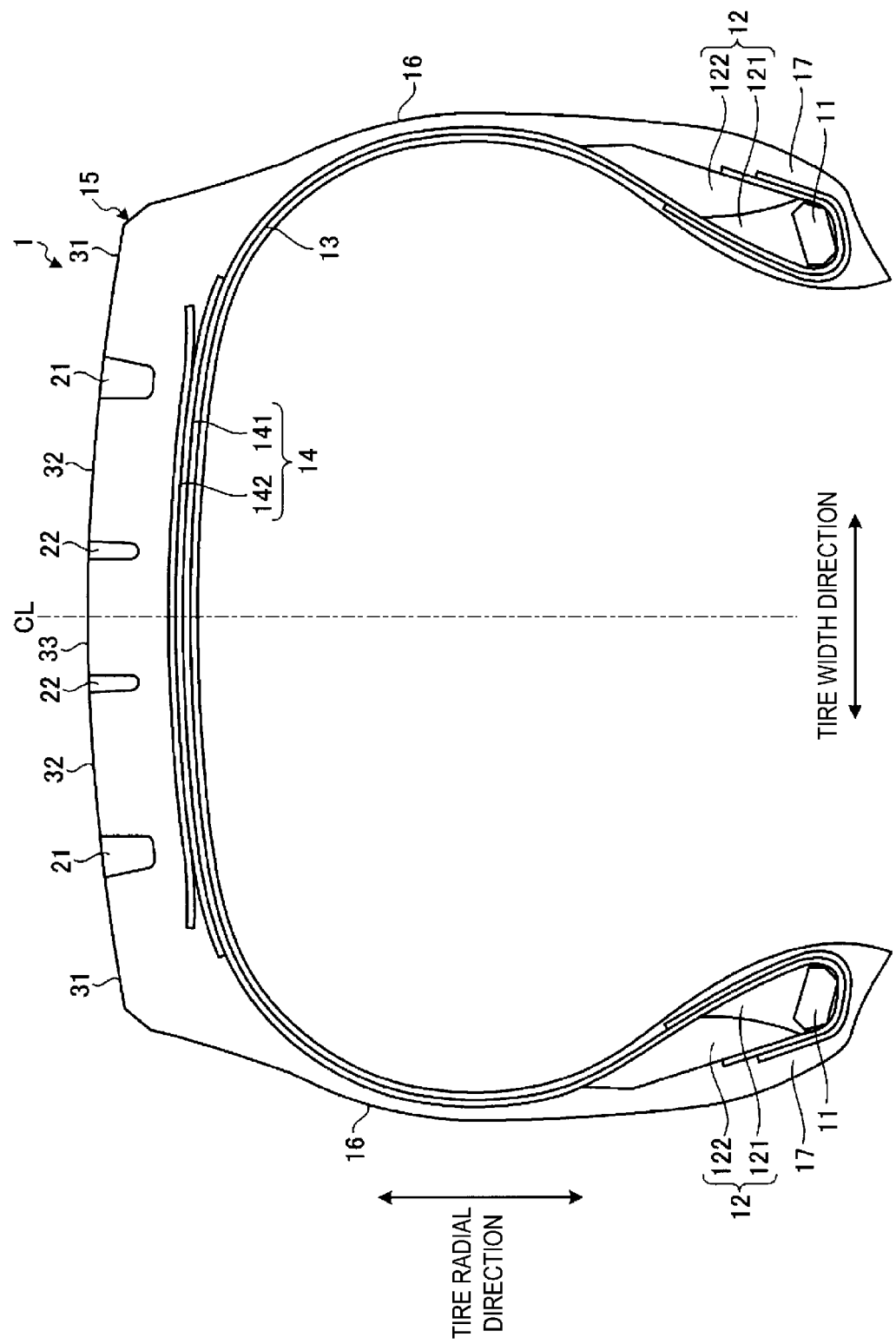
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in the tire radial direction. Moreover, the same drawing illustrates an all-position tire for pickup trucks as an example of a pneumatic tire.

In reference to the same drawing, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire width direction" refers to the direction parallel with the tire rotation axis. "Tire radial direction" refers to the direction perpendicular to the tire rotation axis.

A pneumatic tire 1 has an annular structure with the tire rotation axis as its center and includes: a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are formed by winding one or a plurality of bead wires made of steel by multiple times in an annular shape and are embedded in the bead portion to constitute a core of the left and right bead portions. The pair of bead fillers 12, 12 are disposed outward of the pair of bead cores 11, 11 in the tire radial direction and reinforce the bead portions.

The carcass layer 13 has a single layer structure made from one carcass ply or a multilayer structure made from stacking a plurality of carcass plies and spans between the left and right bead cores 11, 11 in a toroidal shape to form the framework of the tire. Additionally, both edge portions of the carcass layer 13 are turned back to the outer side in the tire width direction so as to wrap around the bead cores 11 and the bead fillers 12 and fixed. The carcass ply of the carcass layer 13 is formed by performing a rolling process on coating rubber-covered carcass cords made from steel or an organic fiber material (for example, aramid, nylon, polyester, rayon, or the like) and has a carcass angle (defined as the inclination angle in the longitudinal direction of the carcass cords with respect to the tire circumferential direction) ranging from 80° to 90° as an absolute value.

The belt layer 14 is formed by laminating a pair of cross belts 141, 142 and is disposed around the outer circumference of the carcass layer 13. The pair of cross belts 141, 142 are made by performing a rolling process on coating rubber-covered belt cords made from steel or an organic fiber material. The cross belts 141, 142 have a belt angle, as an absolute value, ranging from 15° to 55°. Furthermore, the pair of cross belts 141, 142 have belt angles (defined as the inclination angle in the longitudinal direction of the belt cords with respect to the tire circumferential direction) of opposite signs and are stacked so that the longitudinal directions of the belt cords intersect each other (so-called a crossply structure).

The tread rubber 15 is disposed outward of the carcass layer 13 and the belt layer 14 in the tire radial direction and constitutes a tread portion of the tire. The pair of sidewall rubbers 16, 16 are disposed on the outer side of the carcass layer 13 in the tire width direction and constitute left and right sidewall portions. The pair of rim cushion rubbers 17, 17 extend from the inner sides in the tire radial direction of the turned back portions of the carcass layer 13 and the left and right bead cores 11, 11 toward the outer side in the tire width direction to form a rim-fitting surface of the bead portion.

Tread Pattern

Figure 2:
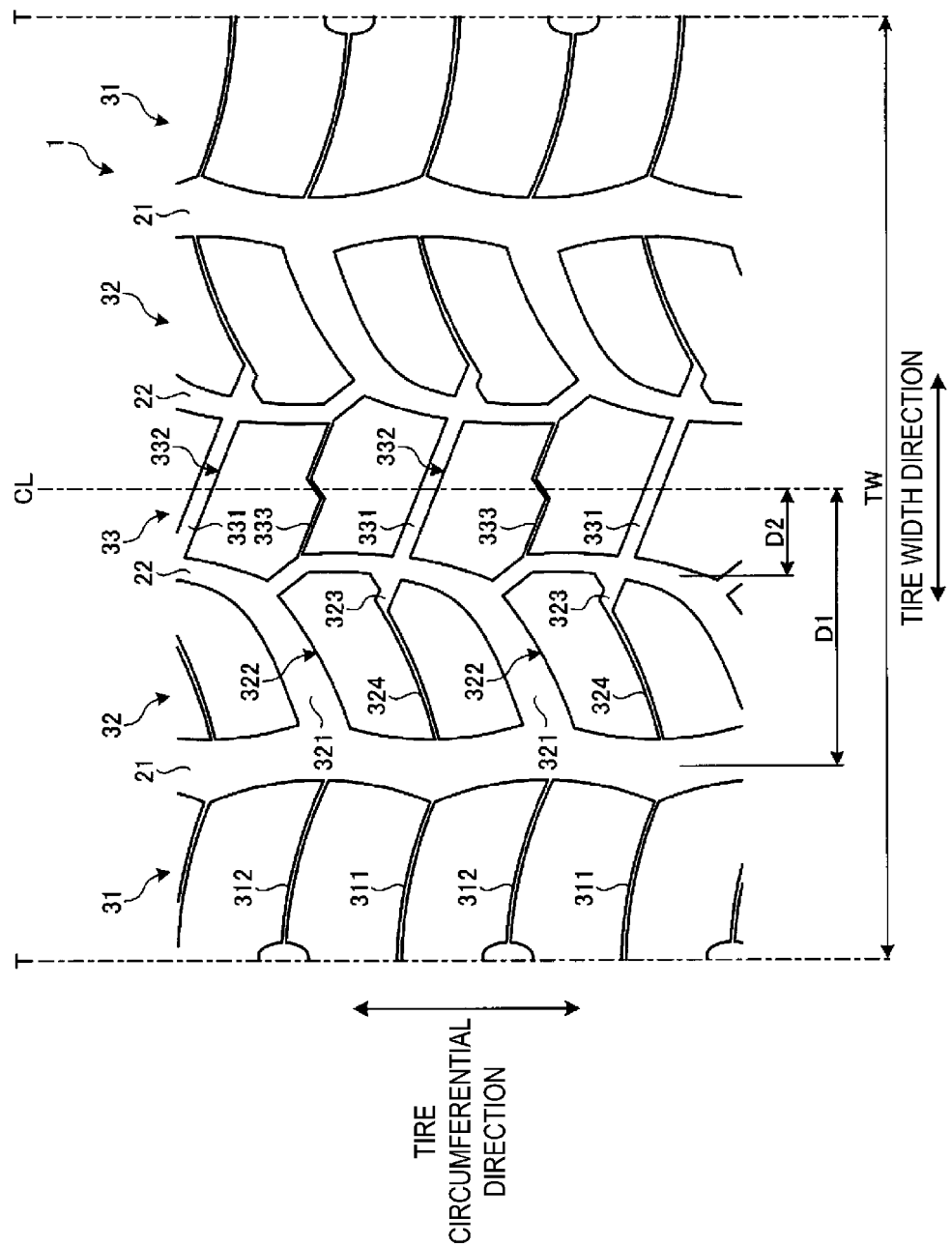
FIG. 2 is a plan view illustrating a tread surface of the pneumatic tire illustrated in FIG. 1.

FIG. 2 is a plan view illustrating a tread surface of the pneumatic tire 1 illustrated in FIG. 1. FIG. 2 illustrates a tread surface of an all-position tire for pickup trucks as an example pneumatic tire 1. In reference to FIG. 2, "tire circumferential direction" refers to the direction revolving about the tire rotation axis. Reference sign T denotes a tire ground contact edge, and dimension sign TW denotes a tire ground contact width.

As illustrated in FIG. 2, the pneumatic tire 1 includes a plurality of circumferential main grooves 21, 22 extending in the tire circumferential direction and a plurality of land portions 31 to 33 defined by the circumferential main grooves 21, 22. The plurality of circumferential main grooves 21, 22 and the plurality of land portions 31 to 33 are provided in a tread surface.

"Main groove" refers to a groove on which a wear indicator must be provided as specified by JATMA (The Japan Automobile Tyre Manufacturers Association, Inc.) and has a groove width of 4.0 mm or greater and a groove depth of 6.5 mm or greater. In particular, in the tire for pickup trucks, the main groove has a groove depth of 10.0 mm or greater. The lug grooves described below are lateral grooves extending in the tire width direction and are open when the tire contacts the ground to function as grooves. Additionally, the sipes described below are cuts formed in the tread contact surface and are distinguished from lug grooves in terms of closing when the tire comes into contact with the ground.

The groove width is measured as the distance between the left and right groove walls at the groove opening portion when the tire is mounted on a specified rim, inflated to the specified internal pressure, and in an unloaded state. In a configuration in which the land portions include notch portions or chamfered portions in the edge portions thereof, the groove width is measured with reference to the intersection points between the tread contact surface and the extension lines of the groove walls as measurement points, in a cross-sectional view in which the groove length direction is a normal direction.

The groove depth is measured as the maximum distance from the tread contact surface to the groove bottom when the tire is mounted on a specified rim, inflated to the specified internal pressure, and in an unloaded state. Additionally, in a configuration in which the grooves include an uneven portion or sipes on the groove bottom, the groove depth is measured excluding these portions.

"Specified rim" refers to a "standard rim" defined by JATMA, a "Design Rim" defined by TRA (The Tire and Rim Association, Inc.), or a "Measuring Rim" defined by ETRTO (The European Tyre and Rim Technical Organisation). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a passenger vehicle tire, the specified internal pressure is an air pressure of 180 kPa, and the specified load is 88% of the maximum load capacity.

For example, in the configuration of FIG. 2, the pneumatic tire 1 has an approximately point symmetric tread pattern having a center point on the tire equatorial plane CL. However, no such limitation is intended, and, for example, the pneumatic tire 1 may have a left-right line symmetric tread pattern or a left-right asymmetric tread pattern with respect to the tire equatorial plane CL as the center and may have a tread pattern having directionality in the tire rotation direction (not illustrated).

Furthermore, in the configuration of FIG. 2, the left and right regions demarcated by the tire equatorial plane CL each have two circumferential main grooves 21, 22. These circumferential main grooves 21, 22 are disposed in left-right symmetry with respect to the tire equatorial plane CL as the center. Five rows of land portions 31 to 33 are defined by these circumferential main grooves 21, 22. In addition, one land portion 33 is disposed on the tire equatorial plane CL.

However, no such limitation is intended, and five or more circumferential main grooves may be disposed, or the circumferential main grooves may be arranged in left-right asymmetry with respect to the tire equatorial plane CL as the center (not illustrated). In addition, the land portion may be arranged at a position off from the tire equatorial plane CL, with one circumferential main groove being arranged on the tire equatorial plane CL (not illustrated).

Additionally, among the circumferential main grooves 21, 22 disposed in one region demarcated by the tire equatorial plane CL, the circumferential main groove 21 on the outermost side in the tire width direction is defined as the shoulder main groove, and the circumferential main groove 22 close to the tire equatorial plane CL is defined as the center main groove.

For example, in the configuration of FIG. 2, a distance D1 from the tire equatorial plane CL to the groove center line of the left and right shoulder main grooves 21, 21 is in a range of from 45% or greater to 75% or smaller of the tire ground contact half-width TW/2. A distance D2 from the tire equatorial plane CL to the groove center line of the left and right center main grooves 22, 22 is in a range of from 10% or greater to 30% or smaller of the tire ground contact half-width TW/2.

The groove center line is defined as an imaginary line connecting the midpoints of the distance between the left and right groove walls.

In a case where the groove center line of the main groove has a zigzag shape or a wave-like shape, the distance to the groove center line is measured using a straight line parallel to the tire circumferential direction passing through the midpoint of the maximum amplitude positions on the left and right of the groove center line as the measurement point.

The tire ground contact width TW is measured as the maximum linear distance in the tire axial direction of a contact surface between the tire and a flat plate when the tire is mounted on a specified rim, inflated to the specified internal pressure, placed perpendicular to the flat plate in a static state, and loaded with a load corresponding to the specified load.

The tire ground contact edge T is defined as the maximum width position in the tire axial direction of the contact surface between the tire and a flat plate when the tire is mounted on a specified rim, inflated to the specified internal pressure, placed perpendicular to the flat plate in a static state, and loaded with a load corresponding to the specified load.

The land portion 31 located on the outer side in the tire width direction defined by the outermost circumferential main groove 21 is defined as a shoulder land portion. The shoulder land portion 31 is a land portion on the outermost side in the tire width direction and is located on the tire ground contact edge T.

The land portion 32 located on the inner side in the tire width direction defined by the outermost circumferential main groove 21 is defined as a middle land portion. Accordingly, the middle land portion 32 is adjacent to the shoulder land portion 31 with the outermost circumferential main groove 21 disposed therebetween.

Furthermore, the land portion 33 located closer to the tire equatorial plane CL than the middle land portion 32 is defined as a center land portion. The center land portion 33 may be disposed on the tire equatorial plane CL (see FIG. 2) or may be arranged at a position off from the tire equatorial plane CL (not illustrated).

Note that in a configuration including four circumferential main grooves as in FIG. 2, a pair of shoulder land portions 31, 31, a pair of middle land portions 32, 32, and a single center land portion 33 are defined. Additionally, for example, in a configuration including five or more circumferential main grooves, two or more rows of center land portions are defined (not illustrated). Moreover, in a configuration including three circumferential main grooves, the middle land portion also serves as the center land portion (not illustrated).

Middle Land Portion and Center Land Portion

Figure 3:
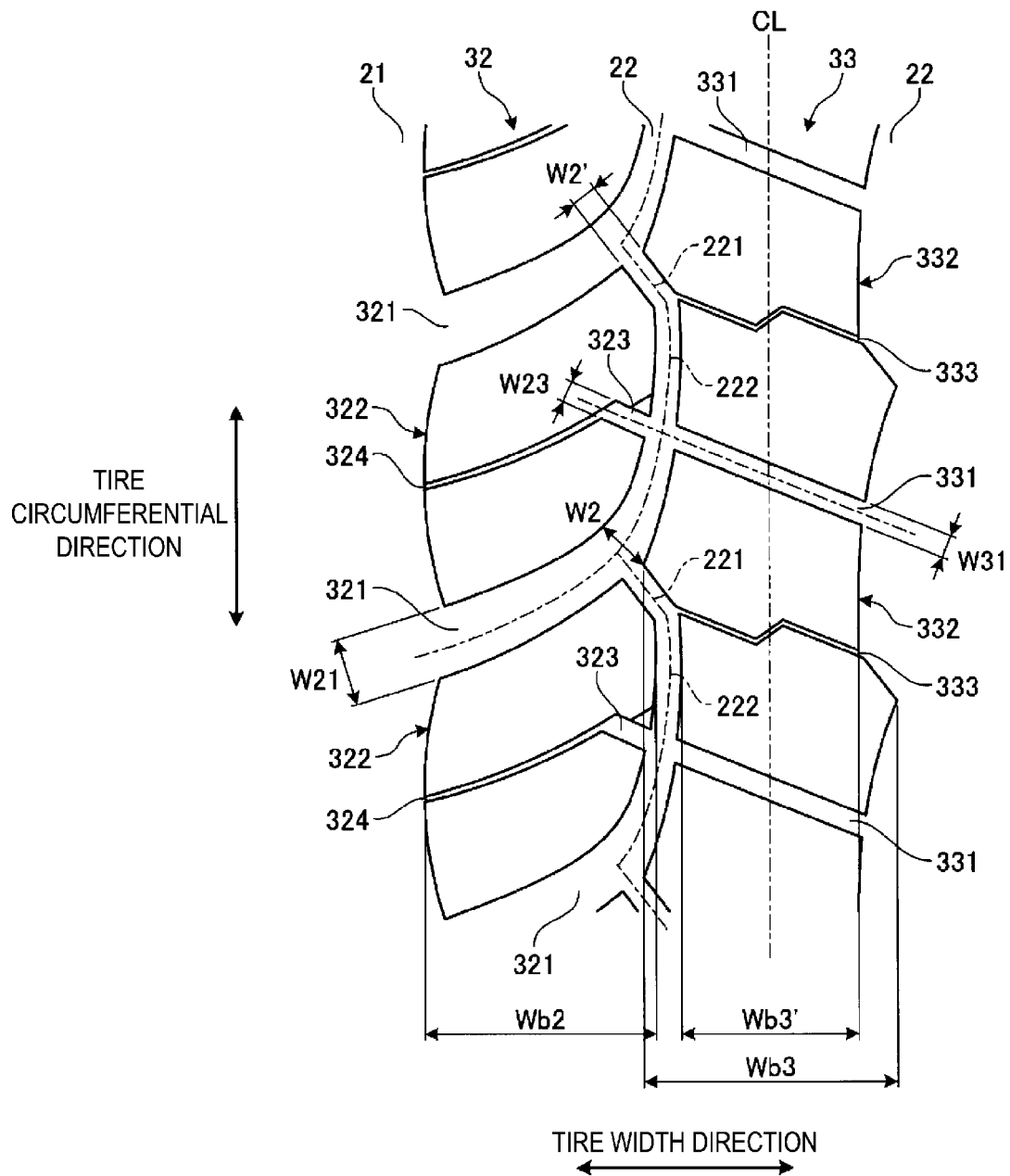
FIG. 3 is an enlarged view illustrating a tread portion center region of the pneumatic tire illustrated in FIG. 2.
Figure 4:
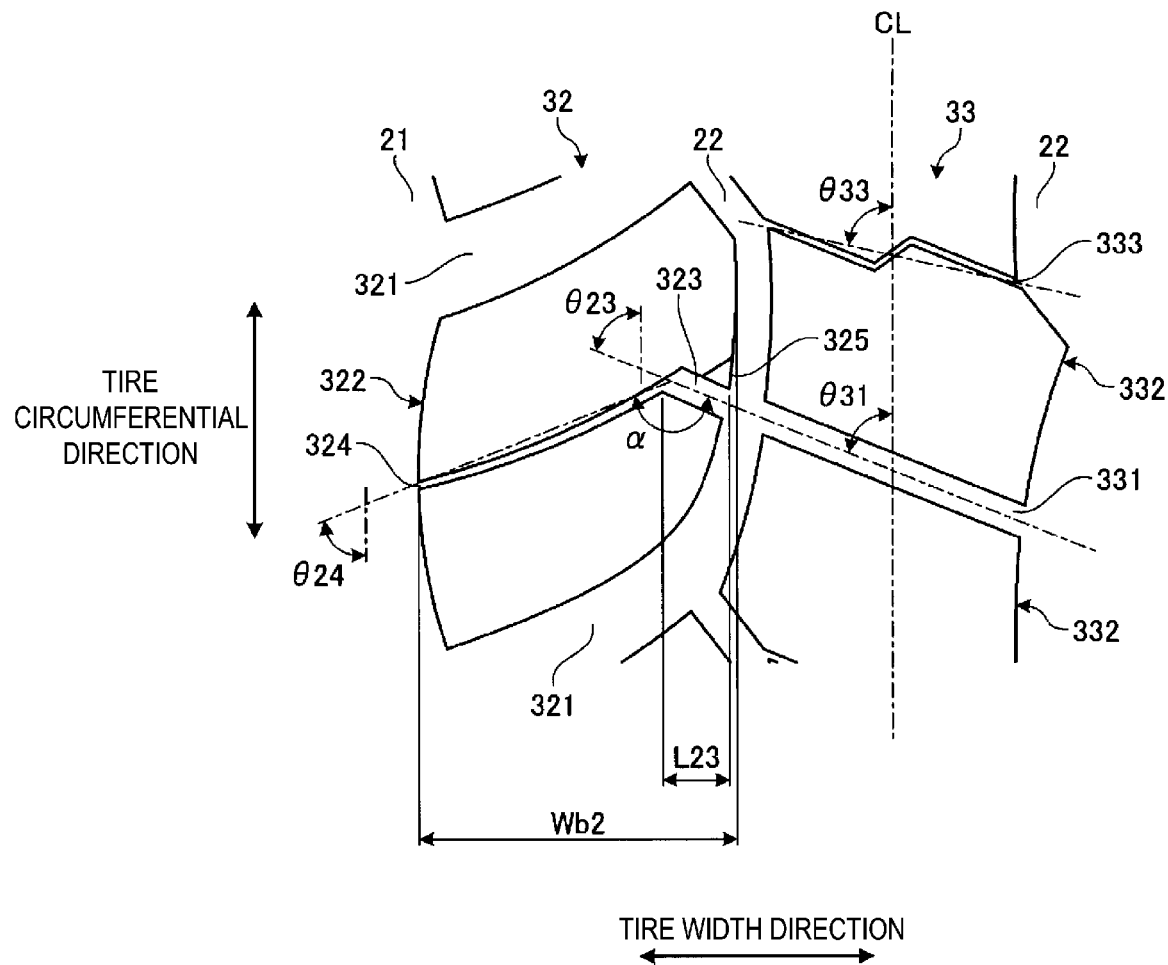
FIG. 4 is an enlarged view illustrating main parts of the tread portion center region illustrated in FIG. 3.
Figure 5:
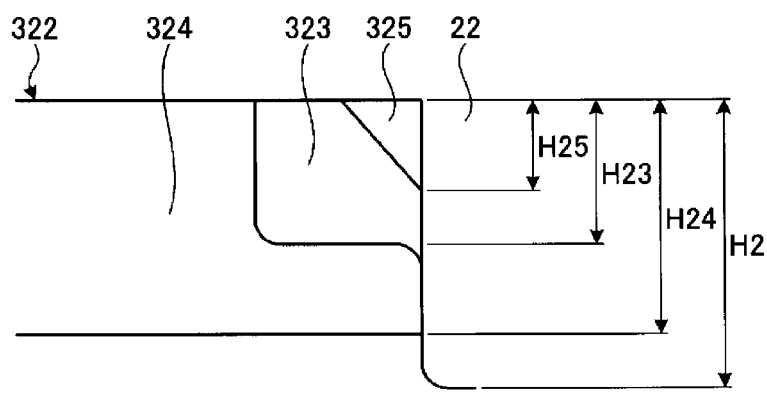
FIG. 5 is a cross-sectional view illustrating main parts of a middle land portion.

FIG. 3 is an enlarged view illustrating the tread portion center region of the pneumatic tire 1 illustrated in FIG. 2. The same drawing illustrates a row of blocks of the middle land portion 32 and the center land portion 33. FIG. 4 is an enlarged view illustrating main parts of the tread portion center region illustrated in FIG. 3. FIG. 5 is a cross-sectional view illustrating main parts of the middle land portion 32. The same drawing illustrates a cross-sectional view including the notch portion 323 and a middle sipe 324 in a middle block 322.

As illustrated in FIG. 2, the middle land portion 32 includes: a plurality of middle lug grooves 321, a plurality of the middle blocks 322, the notch portion 323, and a plurality of the middle sipes 324. Therefore, the middle land portion 32 forms a row of blocks.

The middle lug groove 321 passes through the middle land portion 32 in the tire width direction and is open to the left and right circumferential main grooves 21, 22 partitioning the middle land portion 32. Additionally the plurality of middle lug grooves 321 are disposed at a predetermined interval in the tire circumferential direction. Moreover, a maximum groove width W21 (see FIG. 3) of the middle lug groove 321 is in a range of 5.0 mm≤W21≤15 mm. A maximum groove depth H21 (not illustrated) of the middle lug groove 321 is in a range of 4.0 mm≤H21, and a maximum groove depth H1 (not illustrated) of the shoulder main groove 21 has a relationship of 0.30≤H21/H1≤1.00.

For example, in the configuration of FIG. 3, the center main groove 22 has a bent shape formed by alternately connecting an arc-shaped long portion 222 and a linear short portion 221 in the tire circumferential direction. Moreover, the groove width of the center main groove 22 takes a minimum value W2' at the connection portion (the short portion 221) with the first middle lug groove 321 and takes a maximum value W2 at the connecting portion (the long portion 222) with the second middle lug groove 321. In addition, the linear short portion 221 has a constant groove width. Additionally, the groove width of the arc-shaped long portion 222 increases as it is left from the tire equatorial plane CL.

Additionally, the middle lug groove 321 has an arc shape curved in the tire circumferential direction, and the maximum groove width W21 of the middle lug groove 321 gradually decreases toward the tire equatorial plane CL. Additionally, adjacent middle lug grooves 321, 321 are curved in the same direction. The middle lug groove 321 is smoothly connected to the long portion 222 of the center main groove 22. Therefore, the center main groove 22 appears to be formed by being alternately connected to the short portion 221 and the long portion 222 extended from the middle lug groove 321.

The middle block 322 is defined by adjacent middle lug grooves 321, 321. Additionally, the plurality of middle blocks 322 are arranged in a row in the tire circumferential direction. A ground contact width Wb2 of the middle block 322 preferably has a relationship of 0.25≤Wb2/(TW/2)≤0.50 with respect to the tire ground contact half-width TW/2 and more preferably has a relationship of 0.30≤Wb2/(TW/2)≤0.50.

The block ground contact width is measured as the maximum linear distance in the tire axial direction on a contact surface between the block and a flat plate when the tire is mounted on a specified rim, inflated to the specified internal pressure, placed perpendicular to the flat plate in a static state, and loaded with a load corresponding to the specified load.

Moreover, as illustrated in FIG. 3, the edge portion on the inner side in the tire width direction and the edge portion on the outer side in the tire width direction of the middle block 322 have a shape convex toward the center main groove 22 and the shoulder main groove 21. Additionally, the edge portion on the inner side in the tire width direction of the middle block 322 has a shape corresponding to the long portion 222 and the short portion 221 of the center main groove 22, that is, a bent shape in which an arc-shaped long portion and a linear short portion are connected. Additionally, the edge portion on the outer side in the tire width direction of the middle block 322 has an arc shape formed from a single arc.

As illustrated in FIG. 3, the notch portion 323 is formed in the center portion of the edge portion, close to the tire equatorial plane CL, of the middle block 322. Moreover, a single notch portion 323 is formed in each middle block 322. Furthermore, the notch portion 323 is formed on an extension line of center lug grooves 331 described below and is open toward the groove opening portion of the center lug groove 331. Due to this, the drainage properties of the tread portion center region are improved, and the tire wet traction characteristics are improved. Additionally, an opening width W23 of the notch portion 323 preferably has a relationship of 0.20≤W23/W31≤1.20 with respect to a maximum groove width W31 of the center lug groove 331 described later and more preferably has a relationship of 0.80≤W23/W31≤1.20.

In the configuration of FIG. 2, as illustrated in FIG. 3, the notch portion 323 of the middle block 322 is formed on an extension line of the center lug groove 331 and is open toward the groove opening portion of the center lug groove 331. The notch portion 323 is on an extension line of the groove center line of the center lug groove 331. Moreover, the width W23 of the notch portion 323 is set to be approximately the same as an opening width W31', close to the center main groove 22, of the center lug groove 331 (dimension sign is omitted in the drawing, in FIG. 3, W31=W31').

The notch portion is defined as a step-shaped recess portion (that is, a step portion) having a bottom surface parallel to the road contact surface of the land portion. The notch portion includes a cut groove or a short lug groove.

The opening width of the notch portion is measured as the maximum value of the opening width with respect to the circumferential main groove in a plan view of the block road contact surface. Additionally, in a case where the block has a chamfered portion (reference sign 325 in FIG. 4) in the opening portion of the notch portion, the opening width of the notch portion is measured using the intersection point of the extension line of the edge portion of the block and the extension line of the wall surface of the notch portion as a measurement point.

The chamfered portion is defined as a portion that connects, with a flat surface or a curved surface, the intersection portion between the road contact surface of the land portion and the groove wall surface.

In FIG. 4, an extension length L23 of the notch portion 323 in the tire width direction preferably has a relationship of $0.10 \leq L23/Wb2 \leq 0.90$ with respect to the ground contact width Wb2 of the middle block 322 and more preferably has a relationship of $0.10 \leq L23/Wb2 \leq 0.50$.

The extension length of the notch portion is measured as the maximum value of the extension length of the notch portion in the block road contact surface.

Additionally, as illustrated in FIG. 4, the notch portions 323 are preferably inclined in the same direction in the tire circumferential direction with respect to the center lug grooves 331. In addition, an inclination angle θ23 of the notch portion 323 with respect to the tire circumferential direction is preferably in the range of $35° \leq θ23 \leq 85°$ and more preferably in the range of $60° \leq θ23 \leq 75°$. The inclination angle θ23 of the notch portion 323 preferably has a relationship of $θ31 \leq θ23$ with respect to an inclination angle θ31 of the center lug grooves 331 with respect to the tire circumferential direction.

The inclination angle of the notch portion is measured as the angle between the tire circumferential direction and a straight line connecting the opening portion and the terminating end portion of the notch portion.

In FIG. 5, a depth H23 of the notch portion 323 preferably has a relationship $0.15 \leq H23/H2 \leq 0.35$ with respect to a groove depth H2 of the center main groove 22. Additionally, the depth H23 of the notch portion 323 is preferably deeper than a depth H25 of the chamfered portion 325. Additionally, the chamfered portion 325 may be omitted (not illustrated).

The depth of the notch portion is measured as the maximum depth from the block road contact surface to the step portion of the notch portion.

The depth of the chamfered portion is measured as the maximum depth from the block road contact surface.

As illustrated in FIG. 3, the middle sipe 324 extends from the notch portion 323 in the tire width direction and is open to the edge portion on the outer side in the tire width direction of the middle block 322. With this middle sipe 324, the difference in rigidity between the center portion of the middle block 322 and the circumferential edge portion (the edge portion close to the middle lug groove 321) is mitigated, and thus, heel and toe wear of the tire is suppressed. Additionally, the drainage properties of the road contact surface of the middle blocks 322 are improved, and the wet traction characteristics of the tire is improved. In the configuration illustrated in FIG. 3, the middle sipe 324 has a gentle arc shape with an inclination angle with respect to the tire circumferential direction increased toward the shoulder main groove 21 and extends substantially in parallel to the middle lug groove 321. Additionally, the middle sipe 324 may extend along the notch portion 323 to pass through the step portion of the notch portion 323 (see FIG. 5) and may terminate at the connection portion with the notch portion 323 (not illustrated).

As illustrated in FIG. 3, the middle sipe 324 is open to the center portion of the edge portion of the middle block 322 close to the shoulder main groove 21. Specifically, the distance (dimension sign is omitted in the drawing) in the tire circumferential direction from the measurement point of a circumferential length Le2 of the edge portion, close to the shoulder main groove 21, of the middle block 322 to the opening portion of the middle sipe 324 is preferably in the range of from 30% or greater to 70% or smaller, with respect to the circumferential length Le2, and more preferably in the range of from 35% or greater to 65% or smaller.

In the configuration of FIG. 3, the middle block 322 includes a single middle sipe 324 and does not include other sipes or narrow grooves. Due to this, the rigidity of the middle block 322 can be increased. Furthermore, the ground contact area ratio of the portions of the middle blocks 322 defined by the notch portions 323 and the middle sipes 324 is preferably in the range of from 90% or greater to 110% or smaller and more preferably in the range of from 95% or greater to 105% or smaller. Due to this, the ground contact area of each portion of the middle block 322 is made uniform, and uneven wear of the middle blocks 322 is suppressed.

"Sipe" refers to a cut formed in a tread contact surface and has a sipe width of less than 1.5 mm and a sipe depth of 2.0 mm or greater, so that the sipe closes when the tire comes into contact with the ground.

The sipe width is measured as the maximum distance of the opening width of the sipe at the road contact surface of the land portion, when the tire is mounted on a specified rim, inflated to the specified internal pressure, and in an unloaded state.

The sipe depth is measured as the maximum distance from the tread contact surface to the sipe bottom, when the tire is mounted on a specified rim, inflated to the specified internal pressure, and in an unloaded state. Additionally, in a configuration in which a sipe includes a ridged/grooved portion on the groove bottom, the sipe depth is measured excluding this portion.

Additionally, as illustrated in FIG. 4, the middle sipe 324 is inclined in the opposite direction in the tire circumferential direction with respect to the notch portion 323. Due to this, the connection portion between the middle sipe 324 and the notch portion 323 has a bent shape that protrudes in the tire circumferential direction. In addition, an inclination angle θ24 of the middle sipe 324 with respect to the tire circumferential direction is preferably in the range of $10° \leq θ24 \leq 80°$ and more preferably in the range of $55° \leq θ24 \leq 75°$. In addition, an angle α formed between the notch portion 323 and the middle sipe 324, that is, the bend angle of the connection portion between the middle sipe 324 and the notch portion 323 is preferably in the range of $75° \leq \alpha \leq 175°$ and more preferably within the range of $100° \leq \alpha \leq 145°$.

The inclination angle of the sipe is measured as the angle between the tire circumferential direction and a straight line passing through both end portions of the sipe in the block road contact surface.

In addition, a depth H24 of the middle sipe 324 preferably has a relationship of $H24/H21 \leq 0.95$ with respect to the groove depth H21 (not illustrated) of the middle lug groove 321 and more preferably has a relationship of $H24/H21 \leq 0.90$. Due to this, the middle sipe 324 is shallower than the middle lug groove 321. Additionally, the depth H24 (see FIG. 5) of the middle sipe 324 preferably has a relationship of $0.30 \leq H24/H1 \leq 0.60$ with respect to the groove depth H1 (not illustrated) of the shoulder main groove 21.

Note that, in the configuration of FIG. 2, as described above, the middle block 322 includes the middle sipe 324. In this case, the edge portion of the middle sipe 324 may be chamfered. Furthermore, a narrow groove (not illustrated) may be disposed in place of the middle sipe 324. In such a case, it is necessary that the groove width of the narrow grooves is in the range of from 0.9 mm or greater to 3.0 mm or smaller, and the groove depth is in the range of from 5.0 mm or greater to 10 mm or smaller.

In addition, in the configuration of FIG. 2, the middle sipe 324 has an arc shape, but no such limitation is intended, and the middle sipe 324 may have a straight shape, an S-shape, a bent shape, or the like (not illustrated). Additionally, a chamfered portion may be formed in the edge portion of the middle sipe 324 (not illustrated).

As illustrated in FIG. 2, the center land portion 33 includes: a plurality of the center lug grooves 331, a plurality of center blocks 332, and a plurality of center sipes 333.

The center lug groove 331 passes through the center land portion 33 in the tire width direction and is open to the left and right center main grooves 22, 22 partitioning the center land portion 33. Additionally, the plurality of center lug grooves 331 are arranged at a predetermined interval in the tire circumferential direction.

In FIG. 3, the maximum groove width W31 of the center lug groove 331 is in the range of 2.5 mm $\leq$ W31 $\leq$ 7.0 mm. Additionally, the maximum groove width W21 of the middle lug groove 321 preferably has a relationship of $1.10 \leq W21/W31 \leq 3.50$ with respect to the maximum groove width W31 of the center lug groove 331 and more preferably has a relationship of $1.50 \leq W21/W31 \leq 2.50$.

As illustrated in FIG. 4, the center lug groove 331 is inclined in the opposite direction in the tire circumferential direction with respect to the middle lug groove 321 of the middle land portion 32. The inclination angle θ31 of the center lug groove 331 with respect to the tire circumferential direction is preferably in the range of $35° \leq \theta31 \leq 85°$ and more preferably in the range of $65° \leq \theta31 \leq 80°$.

Additionally, a groove depth H31 (not illustrated) of the center lug groove 331 is in the range of 5.0 mm $\leq$ H31 $\leq$ 16 mm. The groove depth H31 of the center lug groove 331 has a relationship of $0.80 \leq H31/H21 \leq 1.20$ with respect to the groove depth H21 (not illustrated) of the middle lug groove 321. Additionally, in the configuration of FIG. 3, the center lug groove 331 has a linear shape.

The center block 332 is defined by adjacent center lug grooves 331, 331. Additionally, the plurality of center blocks 332 are arranged in a row in the tire circumferential direction.

In FIG. 3, the ground contact width Wb3 of the center block 332 preferably has a relationship of $0.80 \leq Wb3/Wb2 \leq 1.40$ with respect to the ground contact width Wb2 of the middle block 322 and more preferably has a relationship of $0.90 \leq Wb3/Wb2 \leq 1.20$.

As illustrated in FIG. 3, the edge portion in the tire width direction of the center block 332 has a shape in which two arc portions recessed with respect to the left and right center main grooves 22, 22 are connected. Specifically, the edge portion of the center block 332 has a shape corresponding to a pair of the long portions 222, 222 and one short portion 221 of the center main groove 22, that is, a bent shape that connects a pair of arc portions and one linear portion. Additionally, the center block 332 is on the tire equatorial plane CL and has a point symmetrical shape. Additionally, the maximum ground contact width Wb3 and a minimum ground contact width Wb3' of the center block 332 preferably have a relationship of $0.50 \leq Wb3'/Wb3 \leq 0.90$ and more preferably have a relationship of $0.60 \leq Wb3'/Wb3 \leq 0.80$.

Additionally, in the configuration of FIG. 3, the center main groove 22 has a see-through-less structure in which the edge portion of the middle block 322 and the edge portion of the center block 332 overlap in the tire width direction. In other words, the measurement point of the ground contact width Wb2 of the middle land portion 32 on the center main groove 22 side is closer to the tire equatorial plane CL than the measurement point of the ground contact width Wb3 of the center land portion 33. Due to this, the ground contact area ratio of the tread portion center region is enhanced.

As illustrated in FIG. 3, the center sipe 333 passes through the center block 332 in the tire width direction and is open to the left and right center main grooves 22, 22. The center sipe 333 has a step shape with two bent portions and extends substantially in parallel to the center lug groove 331 at the left and right long portions (reference sign is omitted in the drawing) connected to the center main grooves 22, 22.

Additionally, in FIG. 4, an inclination angle θ33 of the center sipe 333 with respect to the tire circumferential direction is preferably in the range of $50° \leq \theta33 \leq 130°$. Additionally, a depth H33 (not illustrated) of the center sipe 333 preferably has a relationship of $1.05 \leq H33/H31$ with respect to the depth H31 of the center lug groove 331 of the center land portion 33 and more preferably has a relationship of $1.10 \leq H33/H31$. Therefore, the center sipe 333 is deeper than the center lug groove 331. Therefore, the depth relationship between the sipe 333 and the lug groove 331 in the center land portion 33 has an opposite tendency with respect to the depth relationship between the sipe 324 and the lug groove 321 in the middle land portion 32. Note that the upper limit of the depth H33 of the center sipe 333 is not particularly limited, but is restricted by the range of the ratio H33/H31 described above.

Deformed Examples

Figure 6:
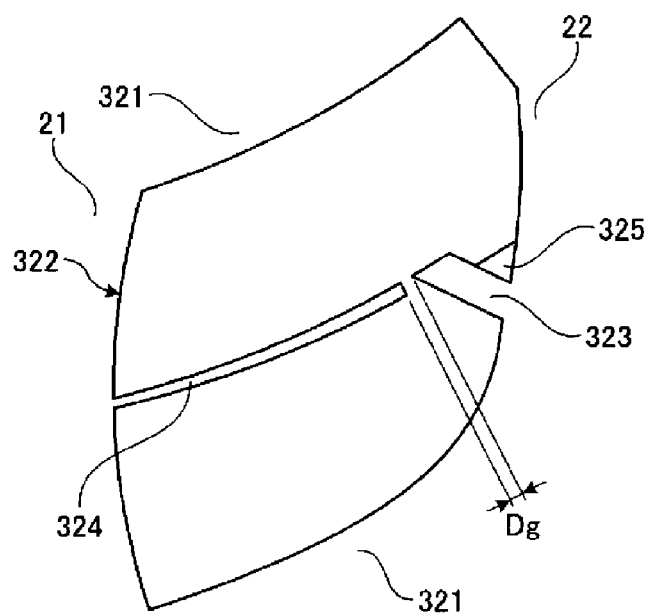
FIG. 6 is an explanatory diagram illustrating a deformed example of the pneumatic tire illustrated in FIG. 2.

FIG. 6 is an explanatory diagram illustrating a deformed example of the pneumatic tire 1 illustrated in FIG. 2. The same drawing illustrates the relationship between the notch portion 323 and the middle sipe 324 of the middle block 322.

In the configuration of FIG. 2, as illustrated in FIGS. 3 and 4, the middle sipe 324 is connected to and open to the notch portion 323, and the middle sipe 324 extends from the opening position and is open to the edge portion of the middle block 322 close to the shoulder main groove 21. Such a configuration is preferable in that the drainage function of the middle sipe 324 is improved.

However, no such limitation is intended, and as illustrated in FIG. 6, the middle sipe 324 may terminate at or near the notch portion 323 without being connected to the notch portion 323, and the middle sipe 324 may extend from this termination position and be open to the edge portion of the middle block 322 close to the shoulder main groove 21. In this case, if a distance Dg between the middle sipe 324 and the notch portion 323 is in the range of Dg≤1.0 mm, it can be said that the middle sipe 324 extends from the notch portion 323. Such a configuration is preferable in that, during tire vulcanization molding, since a small gap can be formed between the molding blade of the middle sipe 324 and the molding blade of the notch portion 323 in the tire mold (not illustrated), vulcanization defects due to dead air space can be reduced. The lower limit of the distance Dg is not particularly limited, but if the distance Dg is 0.3 mm or greater, the air flow path is ensured, and the effect of reducing vulcanization defects is ensured.

Shoulder Land Portion and Second Land Portion

Figure 7:
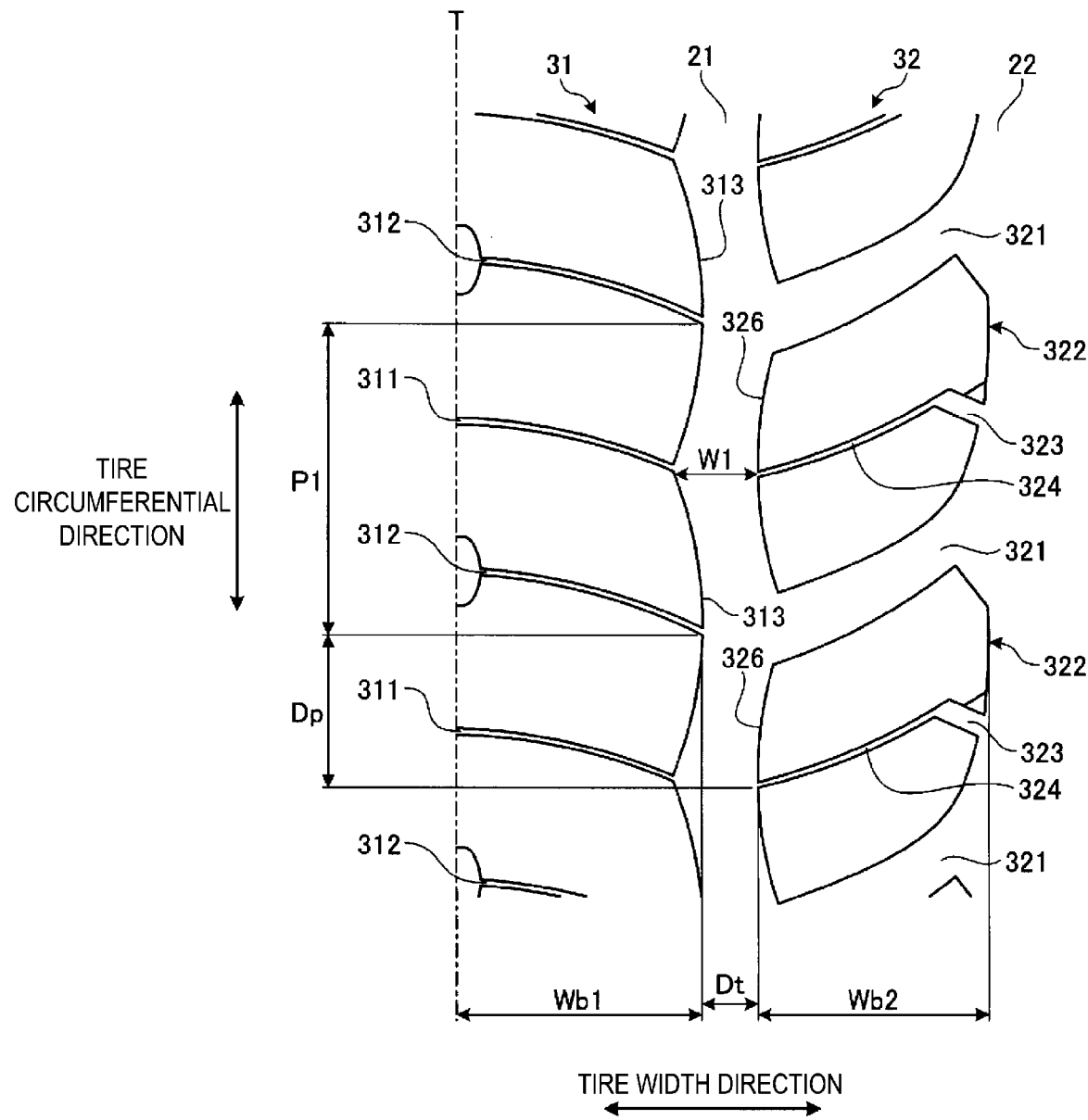
FIG. 7 is an enlarged view illustrating a tread portion shoulder region of the pneumatic tire illustrated in FIG. 2.
Figure 8:
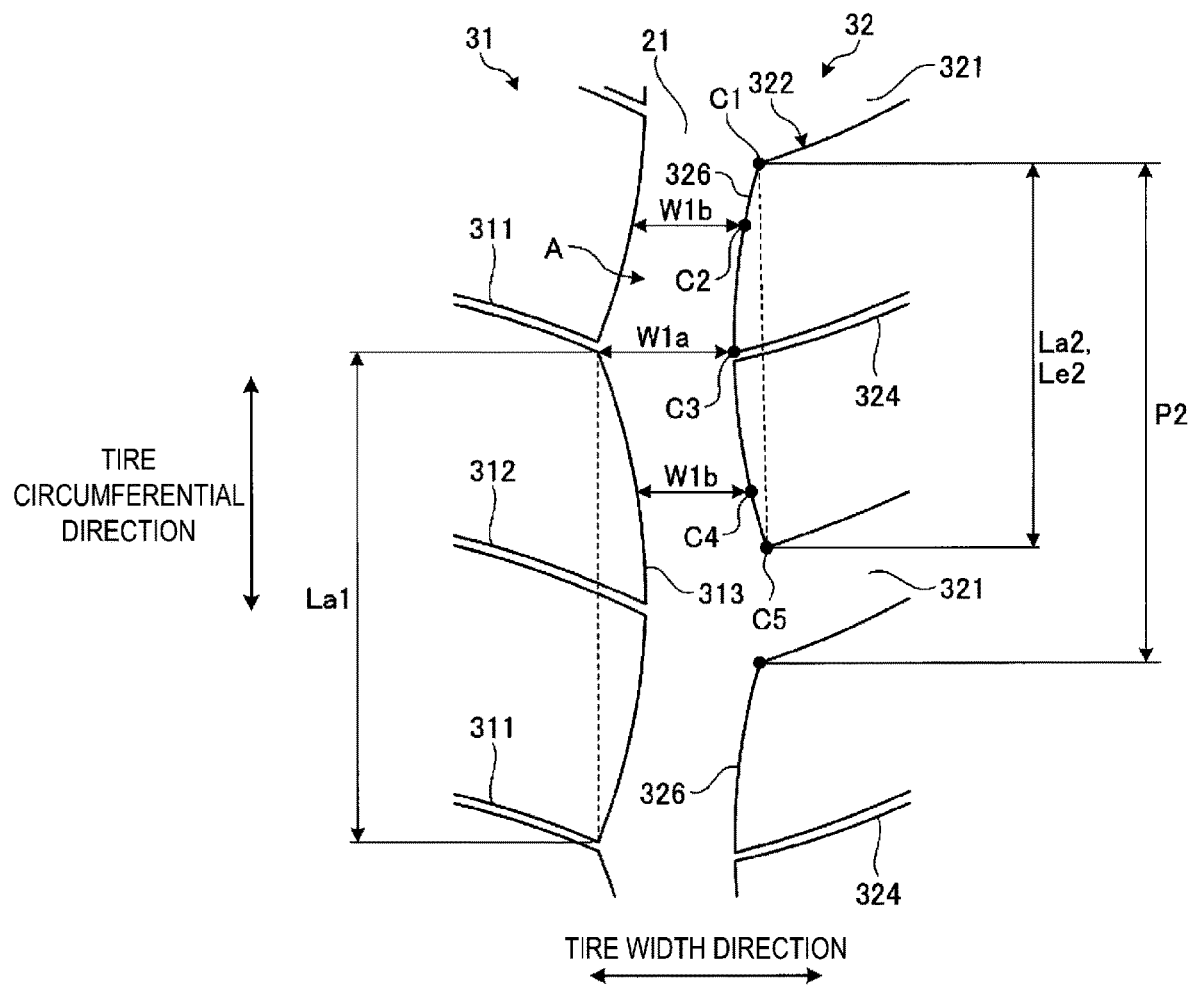
FIG. 8 is an enlarged view illustrating main parts of the tread portion shoulder region illustrated in FIG. 7.

FIG. 7 is an enlarged view illustrating the tread portion shoulder region of the pneumatic tire 1 illustrated in FIG. 2. The same drawing illustrates a row of blocks of the shoulder land portion 31 and the middle land portion 32. FIG. 8 is an enlarged view illustrating main parts of the tread portion shoulder region illustrated in FIG. 7.

As illustrated in FIG. 2, the shoulder land portion 31 includes only a plurality of first and second shoulder sipes 311, 312 and does not include a through lug groove. Due to this, the shoulder land portion 31 is ribs that are continuous in the tire circumferential direction.

The shoulder sipes 311, 312 pass through the shoulder land portion 31 in the tire width direction and are open to the shoulder main groove 21 and the tire ground contact edge T, respectively. Additionally, the first and second shoulder sipes 311, 312 are disposed alternately in the tire circumferential direction. Because these shoulder sipes 311, 312 are closed when the tire comes into contact with the ground, the shoulder land portions 31 are not divided in the tire circumferential direction. Additionally, the shoulder sipes 311, 312 are inclined in mutually opposite directions in the tire circumferential direction with respect to the middle sipes 324 of the middle land portion 32.

As illustrated in FIG. 7, the first shoulder sipe 311 is open to the connection portion of an arc portion 313 (see FIG. 7) to be described later, and the second shoulder sipe 312 is open to the maximum protruding position of the arc portion 313. Additionally, the first and second shoulder sipes 311, 312 have a gentle arc shape with an inclination angle with respect to the tire circumferential direction increasing toward the tire ground contact edge T. The first and second shoulder sipes 311, 312 are inclined in the same direction with respect to the tire circumferential direction. Additionally, the first and second shoulder sipes 311, 312 are inclined in the opposite direction in the tire circumferential direction with respect to the middle sipes 324 of the middle blocks 322.

As illustrated in FIG. 7, the edge portion on the inner side in the tire width direction of the shoulder land portion 31 has a continuous arc shape formed by connecting a plurality of the arc portions 313. In other words, the edge portion of the shoulder land portion 31 includes the plurality of arc portions 313 protruding toward the shoulder main groove 21, and these arc portions 313 are continuously provided in the tire circumferential direction to form a continuous arc shape. Due to this, uneven wear of the edge portion of the shoulder land portion 31 is suppressed.

As described above, the middle land portion 32 includes the plurality of middle blocks 322 defined by the plurality of middle lug grooves 321, and the edge portion on the outer side in the tire width direction of the middle blocks 322 has an arc shape formed by a single arc portion 326. Due to this, the continuous arc shape of the edge portion of the shoulder land portion 31 and the arc shape of the edge portion of the middle land portion 32 face each other across the shoulder main groove 21.

One arc portion is defined as a portion defined by adjacent inflection points on a contour line, which is obtained by extracting a contour line of the edge portion on the main groove side of the land portion in a tread plan view.

Additionally, the radius of curvature of the arc portions 313, 326 is preferably in the range of from 40 mm or greater to 150 mm or smaller.

Additionally, as illustrated in FIG. 7, the maximum protruding position (reference sign is omitted in the drawing) of the arc portion 313 of the shoulder land portion 31 and the maximum protruding position of the arc portion 326 of the middle block 322 are arranged in a staggered manner in the tire circumferential direction. Due to this, the arc portion 313 of the shoulder land portion 31 faces the opening portion of the middle lug groove 321 of the middle land portion 32, and the arc portion 326 of the middle block 322 faces the connection portion (in FIG. 7, the opening portion of the first shoulder sipe 311) of the adjacent arc portions 313 of the shoulder land portion 31.

A distance Dp in the tire circumferential direction between the maximum protruding position of the arc portion 313 of the shoulder land portion 31 and the maximum protruding position of the arc portion 326 of the middle block 322 preferably has a relationship of $0.20 \leq Dp/P1 \leq 0.60$ with respect to a pitch length P1 of the arc portion 313 of the shoulder land portion 31 and more preferably has a relationship of $0.35 \leq Dp/P1 \leq 0.50$. Accordingly, the arc portions 313, 326 of the shoulder land portion 31 and the middle land portion 32 are arranged in a staggered manner in the tire circumferential direction.

Additionally, a ground contact width Wb1 of the shoulder land portion 31 and the ground contact width Wb2 of the middle land portion 32 preferably have a relationship of $0.80 \leq Wb2/Wb1 \leq 1.20$ and more preferably have a relationship of $0.90 \leq Wb2/Wb1 \leq 1.10$.

As illustrated in FIG. 7, the shoulder main groove 21 has a see-through structure in the tire circumferential direction. That is, the edge portions of the left and right land portions 31, 32 do not overlap in the tire width direction when projected in the tire circumferential direction. Additionally, a see-through width Dt and a maximum groove width W1 of the shoulder main groove 21 preferably have a relationship of $0.60 \leq Dt/W1 \leq 0.90$ and more preferably have a relationship of $0.70 \leq Dt/W1 \leq 0.80$. Due to this, the pass-by noise performance and the wet performance of the tire are improved.

The see-through width Dt is measured as the distance Dt in the tire width direction at the maximum width position of the left and right land portions.

Additionally, in FIG. 8, a circumferential length La1 and the pitch length P1 of the arc portion 313 of the shoulder land portion 31 preferably have a relationship of $0.80 \leq La1/P1 \leq 1.00$ and more preferably have a relationship of $0.90 \leq La1/P1 \leq 1.00$. Accordingly, the circumferential length La1 of one arc portion 313 is substantially equal to the pitch length P1 (see FIG. 7) of the arc portion 313, and adjacent arc portions 313 are disposed adjacent to each other to form the edge portion of the shoulder land portion 31.

The circumferential length of the arc portion is measured as the extension length in the tire circumferential direction of a chord connecting both end portions of the arc.

In addition, a circumferential length La2 of the arc portion 326 of the middle block 322 and the circumferential length Le2 of the edge portion thereof preferably have a relationship of 0.80≤La2/Le2≤1.00 and more preferably have a relationship of 0.85≤La2/Le2≤1.00. Due to this, the circumferential length La2 of the arc portion 326 is substantially equal to the circumferential length Le2 of the edge portion, and one arc portion 326 extends across the entire edge portion of the middle block 322 close to the shoulder main groove 21.

The circumferential length of the edge portion of a block is measured as the distance in the tire circumferential direction at each intersection point between the groove wall of the circumferential main groove and the groove walls of a pair of lug grooves, partitioning the block. When the corner portion of the block has a chamfered portion, the intersection point of the groove walls described above is defined by the extension line of the groove wall.

Additionally, as illustrated in FIG. 7, the distance (dimension sign is omitted in the drawing) in the tire circumferential direction from the end portion of the arc portion 313 of the shoulder land portion 31 to the maximum protruding position thereof is preferably in the range of 40% or greater to 60% or smaller, with respect to the circumferential length La1 of the arc portion 313, and more preferably in the range of from 45% or greater to 55% or smaller. Due to this, the maximum protruding position is located in the center of the arc portion 313. Similarly, the distance (dimension sign is omitted in the drawing) in the tire circumferential direction from the end portion of the arc portion 326 of the middle block 322 to the maximum protruding position thereof is preferably in the range of from 40% or greater to 60% or smaller, with respect to the circumferential length La2 of the arc portion 326, and more preferably in the range of from 45% or greater to 55% or smaller.

For example, the edge portion of the middle land portion 32 is recessed at a position where the edge portion of the shoulder land portion 31 projects, and conversely, the edge portion of the middle land portion 32 projects at a position where the edge portion of the shoulder land portion 31 is recessed. Additionally, the maximum protruding position of the arc portion 313 of the shoulder land portion 31 is substantially at the same position in the tire circumferential direction with respect to the maximum protruding position of the arc portion 326 of the middle land portion 32, and the ratio Dp/P1 in FIG. 7 is approximately 50%. Due to this, the distance between the edge portion of the shoulder land portion 31 and the edge portion of the middle land portion 32, that is, the groove width of the shoulder main groove 21, increases or decreases periodically and continuously in the tire circumferential direction. Due to this, the drainage properties of the shoulder main groove 21 are improved, and the tire wet traction characteristics are improved.

Moreover, the maximum groove width W1 of the shoulder main groove 21 is greater than the maximum groove width W2 (see FIG. 3) of the center main groove 22. Due to this, wet performance can be enhanced while ensuring the ground contact area of the tread portion center region. Additionally, the maximum groove width W1 of the shoulder main groove 21 preferably has a relationship of 0.70≤W2/W1≤0.95 with respect to the maximum groove width W2 of the center main groove 22 and more preferably has a relationship of 0.70≤W2/W1≤0.80.

Change in Groove Width of Shoulder Main Groove

Figure 9:
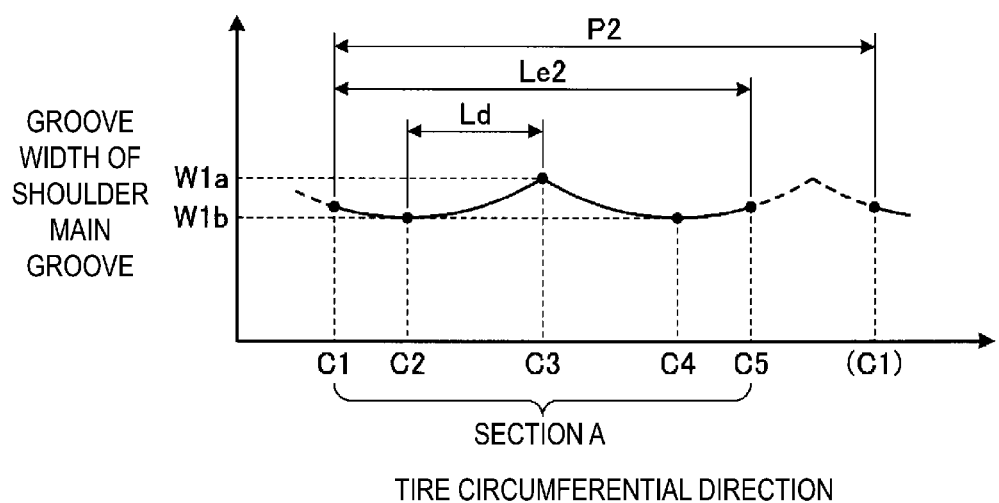
FIG. 9 is a graph illustrating the change in a groove width of a shoulder main groove illustrated in FIG. 8.

FIG. 9 is a graph illustrating the change in groove width of the shoulder main groove illustrated in FIG. 8. The same drawing illustrates the groove width of the shoulder main groove 21 continuously increasing or decreasing in a predetermined section.

In FIG. 8, a section A in the tire circumferential direction along the edge portion close to the shoulder main groove 21, of one middle block 322 is defined. Specifically, the section A is defined as a section in the tire circumferential direction from one end point C1 to the other end point C5 of the edge portion of the middle block 322 close to the shoulder main groove 21. In this section A, the edge portion of the shoulder land portion 31 and the edge portion of the middle land portion 32 face each other, and the groove width of the shoulder main groove 21 can be measured. Furthermore, the section A does not include the opening position of the middle lug groove 321. Additionally, a plurality of sets of the middle blocks 322 and the middle grooves 321 are arranged at a predetermined pitch in the tire circumferential direction, whereby a plurality of the sections A are arranged at a predetermined pitch in the tire circumferential direction.

In this case, as illustrated in FIGS. 8 and 9, the groove width of the shoulder main groove 21 continuously increases or decreases in the section A. Specifically, the groove width of the shoulder main groove 21 gradually decreases from the one end point C1 of the arc portion 326 of the middle block 322 to take the minimum value at a point C2, and then gradually increases to take the maximum value at a point C3. Next, the groove width of the shoulder main groove 21 gradually decreases from the point C3 to take the minimum value at a point C4, and then gradually increases toward the other end point C5 of the arc portion 326. Due to this, as illustrated in FIG. 9, the groove width of the shoulder main groove 21 increases or decreases in a wave-like manner and smoothly in the section A. Additionally, the groove width of the shoulder main grooves 21 cannot be measured at the opening portion of the middle lug groove 321. Then, the change in groove width is repeated periodically in the tire circumferential direction.

In the configuration described above, the groove width of the shoulder main grooves 21 increases or decreases gradually, whereby the air column resonance generated in the shoulder main groove 21 is reduced and the pass-by noise performance of the tire is improved.

Additionally, a minimum value Ld_min of a distance Ld (see FIG. 9) in the tire circumferential direction between the maximum point C3 and the minimum points C2, C4 of the groove width of the shoulder main groove 21 in the section A preferably has a relationship of 0.20≤Ld_min/P2 with respect to a pitch length P2 of the middle lug groove and more preferably has a relationship of 0.25≤Ld_min/P2. Furthermore, the minimum value Ld_min of the distance Ld is preferably in the range of 10 mm≤Ld_min. Due to this, the wavelength of the increase or decrease in groove width becomes gentle, and the drainage properties of the shoulder main groove 21 are ensured.

A maximum value Ld_max of the distance Ld (see FIG. 9) in the tire circumferential direction between the maximum point C3 and the minimum points C2, C4 of the groove width of the shoulder main groove 21 in the section A preferably has a relationship of Ld_max/P2≤0.35 with respect to the pitch length P2 of the middle lug groove and more preferably has a relationship of Ld_max/P2≤0.30. The maximum value Ld_max of the distance Ld is preferably in the range of Ld_max≤20 mm. Due to this, the effect of reducing the air column resonance, due to the increase or decrease in groove width, is ensured.

Additionally, the number of extreme points of the groove width of the shoulder main groove 21 in the section A is preferably three or more. The effect of reducing the air column resonance, due to the increase or decrease in groove width, is ensured. The upper limit of the number of extreme points is not particularly limited, but is restricted by the distance Ld range described above. For example, in the configuration of FIG. 8, the arc portion 313 of the shoulder land portion 31 and the arc portion 326 of the middle block 322 are arranged in a staggered manner in the tire circumferential direction, whereby as illustrated in FIG. 9, the groove width of the shoulder main groove 21 has one maximum point and two minimum points in the section A. Moreover, the minimum value at the point C2 and the minimum value at the point C4 have an identical value W1b. However, no such limitation is intended, and two minimum values W1b may have different values.

Furthermore, a maximum value W1a and the minimum value W1b of the groove width of the shoulder main groove 21 in the section A preferably have a relationship of $1.05 \leq W1a/W1b \leq 1.50$ and more preferably have a relationship of $1.10 \leq W1a/W1b \leq 1.25$. Due to this, the oscillation of the groove width is made appropriate. Note that the maximum value W1a and the minimum value W1b of the groove width have a relationship of $W1a \leq W1$ and $W1' \leq W1b$, with respect to the maximum value W1 and a minimum value W1' of the groove width in the entire circumference of the tire.

Effects

As described above, the pneumatic tire 1 includes: the shoulder main groove 21 and the center main groove 22 disposed in one region demarcated by the tire equatorial plane CL; and the shoulder land portion 31 and the middle land portion 32 defined by the shoulder main groove 21 (see FIG. 2). Additionally, the shoulder land portion 31 is a rib that is continuous in the tire circumferential direction, and the middle land portion 32 includes the plurality of middle lug grooves 321 and the plurality of middle blocks 322 defined by the middle lug grooves 321. Moreover, when the section A in the tire circumferential direction along the edge portion, close to the shoulder main groove 21, of one middle block 322 is defined, the groove width of the shoulder main groove 21 continuously increases or decreases in the section A (see FIGS. 8 and 9).

Such a configuration provides an advantage that since the groove width of the shoulder main grooves 21 increases or decreases continuously, the air column resonance generated in the shoulder main grooves 21 is reduced, and the pass-by noise performance of the tire is improved. Additionally, since the groove width of the shoulder main groove 21 increases or decreases continuously, there is an advantage that the pass-by noise performance can be improved as compared to a configuration in which the groove width of the center main groove continuously increases or decreases. In particular, in a tire for commercial vehicles, a tread pattern in which a wide lug groove is provided in a shoulder land portion is widely adopted to improve the traction performance and the wet performance. However, in such a tread pattern, the pass-by noise performance tends to degrade due to the wide lug grooves. In this regard, the configuration described above is beneficial in that the pass-by noise performance, the traction performance, and the wet performance can be achieved in a compatible manner.

Additionally, in the pneumatic tire 1, the minimum value Ld_min of the distance Ld (see FIG. 9) in the tire circumferential direction between the maximum point C3 and the minimum point C2 of the groove width of the shoulder main groove 21 in the section A has a relationship of $0.20 \leq Ld\_min/P2$ with respect to the pitch length P2 of the middle lug groove 321. Due to this, there is an advantage that the wavelength of the increase or decrease in groove width becomes gentle, and the drainage properties of the shoulder main grooves 21 are ensured.

Additionally, in the pneumatic tire 1, the minimum value Ld_min of the distance Ld (see FIG. 9) in the tire circumferential direction between the maximum point C3 and the minimum point C2 of the groove width of the shoulder main groove 21 in the section A is in the range of $10 \text{ mm} \leq Ld\_min$. Due to this, there is an advantage that the wavelength of the increase or decrease in groove width becomes gentle, and the drainage properties of the shoulder main grooves 21 are ensured.

Additionally, in the pneumatic tire 1, the number of extreme points of the groove width of the shoulder main groove 21 in the section A is three or more (see FIG. 9). Due to this, there is an advantage that the effect of reducing the air column resonance, due to the increase or decrease in groove width, is ensured.

Additionally, in the pneumatic tire 1, the maximum value W1a and the minimum value W1b of the groove width of the shoulder main groove 21 in the section A have a relationship of $1.05 \leq W1a/W1b \leq 1.50$. Due to this, there is an advantage that the oscillation of the groove width is made appropriate and the pass-by noise performance and the wet performance of the tire are improved. In other words, with the lower limit described above, the oscillation of the groove width is ensured, and the effect of reducing the air column resonance, due to the increase or decrease in groove width, is ensured. With the upper limit described above, the drainage properties of the shoulder main groove 21 are ensured, and the occurrence of hydroplaning is suppressed.

Additionally, in the pneumatic tire 1, the see-through width Dt (see FIG. 7) and the maximum groove width W1 of the shoulder main groove 21 have a relationship of $0.60 \leq Dt/W1 \leq 0.90$. Due to this, there is an advantage that the pass-by noise performance and the wet performance of the tire are improved. In other words, with the lower limit described above, the drainage properties of the shoulder main grooves 21 are ensured. With the upper limit described above, the effect of reducing the air column resonance, due to the increase or decrease in groove width, is ensured.

Additionally, in the pneumatic tire 1, the edge portion of the shoulder land portion 31 has a shape formed by connecting the plurality of arc portions 313 projecting toward the shoulder main grooves 21 (see FIG. 7). In addition, the edge portion of the middle block 322 has a shape formed by a single arc portion 326 that projects toward the shoulder main groove 21. Due to this, there is an advantage that the increase or decrease in the groove width of the shoulder main groove 21 (see FIG. 9) can be efficiently formed. Additionally, as compared to a configuration in which the edge portion of the land portion has a zigzag shape (not illustrated), there is an advantage that the ground contact area of the land portion is increased and the wear durability of the land portion is improved.

Additionally, in the pneumatic tire 1, the radius of curvature of the arc portion 313; 326 of the shoulder land portion 31 or the middle block 322 is in the range of from 40 mm or greater to 150 mm or smaller. There is an advantage that due to the lower limit described above, the drainage properties of the shoulder main grooves 21 are ensured and the occurrence of hydroplaning is suppressed, and that due to the upper limit described above, the effect of reducing the air column resonance, due to the increase or decrease in groove width, is ensured.

Additionally, in the pneumatic tire 1, a distance (not illustrated) in the tire circumferential direction from the end portion of the arc portion 313; 326 of the shoulder land portion 31 or the middle block 322 to the maximum protruding position thereof is in the range of from 40% or greater to 60% or smaller with respect to the circumferential length La1; La2 of the arc portion 313; 326 (see FIG. 9). Such a configuration provides an advantage that since the maximum protruding position of the arc portion 313; 326 is disposed in the center portion of the arc portion 313; 326, the increase or decrease (see FIG. 9) in the groove width of the shoulder main groove 21 can be efficiently formed.

Additionally, in the pneumatic tire 1, the distance Dp (see FIG. 7) in the tire circumferential direction between the maximum protruding position of the arc portion 313 of the shoulder land portion 31 and the maximum protruding position of the arc portion 326 of the middle block 322 has a relationship of $0.20 \leq Dp/P1 \leq 0.60$ with respect to the pitch length P1 of the arc portion 313 of the shoulder land portion 31. Such a configuration provides an advantage that since the arc portions 313, 326 of the shoulder land portion 31 and the middle land portion 32 are arranged in a staggered manner in the tire circumferential direction, the increase or decrease (see FIG. 9) in the groove width of the shoulder main grooves 21 can be efficiently formed.

Additionally, in the pneumatic tire 1, the circumferential length La1 and the pitch length P1 of the arc portion 313 of the shoulder land portion 31 have a relationship of $0.80 \leq La1/P1 \leq 1.00$ (see FIG. 8). Due to this, there is an advantage that the increase or decrease in the groove width of the shoulder main groove 21 (see FIG. 9) can be efficiently formed.

Additionally, in the pneumatic tire 1, the circumferential length La2 of the arc portion 326 of the middle block 322 and the circumferential length Le2 of the edge portion have a relationship of $0.80 \leq to \leq 1.00$ (see FIG. 8). Due to this, there is an advantage that the increase or decrease in the groove width of the shoulder main groove 21 (see FIG. 9) can be efficiently formed.

Additionally, in the pneumatic tire, the shoulder land portion 31 includes the sipe 311 (see FIG. 7) or a narrow groove (not illustrated) that is open to the connection portion of the adjacent arc portions 313, 313. Due to this, there is an advantage that the traction performance can be improved while maintaining the wet performance.

Additionally, in the pneumatic tire 1, the shoulder land portion 31 includes the shoulder sipe 312 that is open to the maximum protruding position of the arc portion 313 (see FIG. 7). Due to this, there is an advantage that the traction performance can be improved while maintaining the wet performance.

In addition, in the pneumatic tire 1, the middle land portion 32 includes the middle sipe 324 that is open to the maximum protruding position of the arc portion 326 (see FIG. 7). Due to this, there is an advantage that the traction performance can be improved while maintaining the wet performance.

EXAMPLE

FIGS. 10A and 10B include a table showing the results of performance tests of pneumatic tires according to embodiments of the technology.

In the performance tests, (1) noise performance, (2) wet performance, and (3) uneven wear resistance performance are evaluated for a plurality of test tires. Test tires having a tire size of 225/70R19.5 are assembled on rims specified by JATMA, and an air pressure and a load specified by JATMA are applied to the test tires. The test tires are mounted on the front wheels of 2-D (pickup truck) which is a test vehicle.

(1) In the evaluation of noise performance, the pass-by noise of the vehicle is measured under the test conditions of the ECE (Economic Commission for Europe) R117-02 and evaluations are performed. Results of the evaluation are expressed as index values and evaluated with the Conventional Example being assigned as the reference (100). In this evaluation, larger values are preferable.

(2) In the evaluation of wet performance, the test vehicle is driven on an asphalt road surface sprayed with a water depth of 1 mm, and an acceleration in a speed range of from 5 to 20 km/h is measured. Evaluation was carried out by expressing the measurement results as index values with the results of the Conventional Example being defined as the reference (100). In the evaluation, larger values are preferable.

(3) In the evaluation of uneven wear resistance performance, the test vehicle is driven for 40000 km on a paved road, and then heel and toe wear generated in the blocks is observed, and evaluations are performed. Results of the evaluation are expressed as index values and evaluated with the Conventional Example being assigned as the reference (100). In this evaluation, larger values are preferable. Moreover, if the evaluation is 98 or higher, it is deemed that the performance is properly ensured.

The test tires of Examples 1 to 16 have the configuration illustrated in FIGS. 1 and 2, wherein the shoulder land portion 31 is a rib continuous in the tire circumferential direction, and the middle land portion 32 and the center land portion 33 are rows of blocks defined by lug grooves. Additionally, the tire ground contact width TW is 190 mm, the distances D1, D2 of the shoulder main groove 21 and the center main groove 22 are 55.5 mm and 16.3 mm, respectively. Additionally, the maximum groove width W1 of the shoulder main groove 21 is 12.5 mm, and the maximum groove width W2 of the center main groove 22 is 3.5 mm. Additionally, the ground contact widths Wb1, Wb2 of the shoulder land portion 31 and the middle land portion 32 are 36.0 mm and 33.5 mm, respectively. The pitch length P1 of the arc portion 313 of the shoulder land portion 31 is 43.0 mm or greater and 46.0 mm or smaller, and the pitch length P2 of the middle lug groove 321 of the middle land portion 32 is 43.0 mm or greater and 46.0 mm or smaller.

The test tire of Conventional Example has the configuration of Example 1 wherein the center land portion 33 is a rib that is continuous in the tire circumferential direction and does not include lug grooves. Additionally, the shoulder main grooves 21 have a straight shape since the edge portions of the shoulder land portions 31 and the middle blocks 322 close to the shoulder main grooves 21 have a straight shape. Moreover, the edge portions of the center land portion 33 and the middle blocks 322 close to the center main groove 22 have a continuous arc shape and a single arc shape similarly to the edge portions of the shoulder land portions 31 and the middle blocks 322 close to the shoulder main grooves 21. Due to this, the groove width of the center main groove 22 continuously increases or decreases in the tire circumferential direction. Note that in the table of FIGS. 10A and 10B, for comparison, the numerical values of the center main grooves of Conventional Example are described as numerical values of the shoulder main grooves.

As can be seen from the test results, the noise performance, the wet performance, and the uneven wear resistance performance of the tire are improved in the test tires of Examples 1 to 16.

The invention claimed is:

1. A pneumatic tire, comprising:
a shoulder main groove and a center main groove disposed in one region demarcated by a tire equatorial plane; and
a shoulder land portion and a middle land portion defined by the shoulder main groove,
the shoulder land portion being a rib that is continuous in a tire circumferential direction,
the middle land portion comprising a plurality of middle lug grooves and a plurality of middle blocks defined by the plurality of middle lug grooves,
a section A in the tire circumferential direction being defined along an edge portion, close to the shoulder main groove, of one of the plurality of middle blocks, and
a groove width of the shoulder main groove continuously increasing or decreasing in the section A, wherein
an edge portion of the shoulder land portion has a shape formed by connecting a plurality of arc portions projecting toward the shoulder main groove, and
an edge portion of each of the plurality of middle blocks has a shape formed by a single arc portion projecting toward the shoulder main groove.

2. The pneumatic tire according to claim 1, wherein a minimum value $Ld\_min$ of a distance Ld in the tire circumferential direction between a maximum point and a minimum point of the groove width of the shoulder main groove in the section A has a relationship of $0.20 \leq Ld\_min/P2$ with respect to a pitch length P2 of the plurality of middle lug grooves.

3. The pneumatic tire according to claim 1, wherein a minimum value $Ld\_min$ of a distance Ld in the tire circumferential direction of a maximum point and a minimum point of the groove width of the shoulder main groove in the section A is in a range of $10 \text{ mm} \leq Ld\_min$.

4. The pneumatic tire according to claim 1, wherein the number of extreme values of the groove width of the shoulder main groove in the section A is three or more.

5. The pneumatic tire according to claim 1, wherein a maximum value W1a and a minimum value W1b of the groove width of the shoulder main groove in the section A have a relationship of $1.05 \leq W1a/W1b \leq 1.50$.

6. The pneumatic tire according to claim 1, wherein a see-through width Dt and a maximum groove width W1 of the shoulder main groove have a relationship of $0.60 \leq Dt/W1 \leq 0.90$.

7. The pneumatic tire according to claim 1, wherein a radius of curvature of the plurality of arc portions of the shoulder land portion or the plurality of middle blocks is in a range of from 40 mm or greater to 150 mm or smaller.

8. The pneumatic tire according to claim 1, wherein a distance in the tire circumferential direction from an end portion of each of the plurality of arc portions of the shoulder land portion or the plurality of middle blocks to a maximum protruding position thereof is in a range of from 40% or greater to 60% or smaller with respect to a circumferential length of each of the plurality of arc portions.

9. The pneumatic tire according to claim 1, wherein a distance Dp in the tire circumferential direction between a maximum protruding position of each of the plurality of arc portions of the shoulder land portion and a maximum protruding position of each of the plurality of arc portions of the plurality of middle blocks has a relationship of $0.20 \leq Dp/P1 \leq 0.60$ with respect to a pitch length P1 of the plurality of arc portions of the shoulder land portion.

10. The pneumatic tire according to claim 1, wherein a circumferential length La1 and a pitch length P1 of the plurality of arc portions of the shoulder land portion have a relationship of $0.80 \leq La1/P1 \leq 1.00$.

11. The pneumatic tire according to claim 1, wherein a circumferential length La2 of each of the plurality of arc portions of the plurality of middle blocks and a circumferential length Le2 of the edge portion have a relationship of $0.80 \leq La2/Le2 \leq 1.00$.

12. The pneumatic tire according to claim 1, wherein the shoulder land portion comprises a sipe or a narrow groove that is open to a connection portion between the plurality of arc portions that are adjacent.

13. The pneumatic tire according to claim 1, wherein the shoulder land portion comprises a shoulder sipe that is open to a maximum protruding position of each of the plurality of arc portions.

14. The pneumatic tire according to claim 1, wherein the middle land portion comprises a middle sipe that is open to a maximum protruding position of each of the plurality of arc portions.

* * * * *